United States Patent
Shukla

(10) Patent No.: US 8,399,533 B2
(45) Date of Patent: Mar. 19, 2013

(54) PHOTOCURABLE COMPOSITIONS CONTAINING N-OXYAZINIUM SALT PHOTOINITIATORS

(75) Inventor: Deepak Shukla, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 190 days.

(21) Appl. No.: 12/946,074

(22) Filed: Nov. 15, 2010

(65) Prior Publication Data

US 2012/0123010 A1 May 17, 2012

(51) Int. Cl.
- *C08G 59/68* (2006.01)
- *C08F 20/22* (2006.01)
- *C08F 299/02* (2006.01)
- *C08F 2/50* (2006.01)

(52) U.S. Cl. ............ 522/25; 522/182; 522/163; 522/28; 522/26

(58) Field of Classification Search .................. 522/26, 522/28, 63, 182
See application file for complete search history.

(56) References Cited

U.S. PATENT DOCUMENTS

| | | | |
|---|---|---|---|
| 3,699,022 A | 10/1972 | Behrens et al. | |
| RE27,922 E | 2/1974 | Heseltine et al. | |
| RE27,925 E | 2/1974 | Jenkins et al. | |
| 4,186,069 A * | 1/1980 | Muzyczko et al. | 430/175 |
| 4,743,528 A | 5/1988 | Farid et al. | |
| 4,743,530 A | 5/1988 | Farid et al. | |
| 4,940,645 A * | 7/1990 | Davis et al. | 430/138 |
| 5,091,280 A * | 2/1992 | Yamaguchi et al. | 430/138 |
| 6,476,092 B1 * | 11/2002 | Kunita | 522/31 |
| 6,902,864 B2 * | 6/2005 | Kunita et al. | 430/287.1 |
| 7,063,936 B2 * | 6/2006 | Kakino et al. | 430/287.1 |
| 7,632,879 B2 | 12/2009 | Majumdar et al. | |
| 2012/0121815 A1* | 5/2012 | Shukla | 427/487 |
| 2012/0122664 A1* | 5/2012 | Shukla et al. | 502/167 |

FOREIGN PATENT DOCUMENTS

GB 2 083 832 3/1982

OTHER PUBLICATIONS

Shukla et al., *J.Org. Chem.* 70, No. 17, 6809-6819, Chain Amplification in Photoreactions of N-Alkoxypyridinium Salts with Alcohols: Mechanism and Kinetics.

* cited by examiner

*Primary Examiner* — Ling Choi
*Assistant Examiner* — Jessica E Whiteley
(74) *Attorney, Agent, or Firm* — J. Lanny Tucker

(57) ABSTRACT

A photocurable composition includes at least one N-oxyazinium salt photoinitiator, a photosensitizer for the N-oxyazinium salt photoinitiator, an N-oxyazinium salt efficiency amplifier, and one or more photocurable acrylates. This composition can be cured using irradiation under high efficiency. Curing can be carried out in oxygen-containing environment.

21 Claims, No Drawings

PHOTOCURABLE COMPOSITIONS CONTAINING N-OXYAZINIUM SALT PHOTOINITIATORS

FIELD OF THE INVENTION

This invention relates to photocurable compositions containing acrylate compounds that can be cured efficiently using actinic radiation. In particular, the composition can be cured in air or other oxygen-containing environments.

BACKGROUND OF THE INVENTION

N-oxyazinium salts are known to be photoinitiators for photocrosslinking and photopolymerization as described for example in U.S. Pat. Reissues 27,922 and 27,925 (both Heseltine et al.). Since most N-oxyazinium salt initiators absorb light in UV region of the electromagnetic spectrum, it is common practice to employ a photosensitizer co-initiator to increase their spectral response.

It is generally accepted that photosensitizing co-initiators function by absorption of a photon that results in excitation of an electron from an occupied molecular orbital to a higher energy, unoccupied orbital. The spin of the electron excited to the higher energy orbital corresponds to that which it exhibits in its original orbital or ground state. Thus, the photosensitizer in its initially formed excited state is in a singlet excited state. The lifetime of the singlet excited state is limited, typically less than a few nanoseconds. The excited photosensitizer can return from its singlet excited state directly to its original ground state, dissipating the captured photon energy. Alternatively, the singlet excited state photosensitizer in some instances undergoes intersystem crossing through spin inversion to another excited state, referred to as a triplet state, wherein lifetimes are typically in the microsecond to millisecond range. Since photosensitizer co-initiators that exhibit triplet states have longer lifetimes, the presence of the photosensitizer co-initiators provides a much longer time period for reaction.

GB Publication 2,083,832 (Specht et al.) describes photoinitiator compositions that comprise N-oxyazinium salts and co-initiators based on amino-substituted ketocoumarin triplet photosensitizers. The amino-substituted ketocoumarins exhibit very high intersystem crossing (or triplet state generation) efficiencies ranging well above 10%. U.S. Pat. No. 4,743,528 (Farid et al.) disclose a photoinitiator composition comprising an N-oxyazinium salt, an N-oxyazinium activator, and a photosensitizer having a reduction potential that in relation to the reduction potential of the N-oxyazinium salt activator is at most 0.1 V more positive, and an electron rich amino-substituted benzene. Similarly, U.S. Pat. No. 4,743,530 (Farid et al.) describes photoinitiator compositions containing an N-oxyazinium salt activator and a dye based photosensitizer with maximum absorption above 550 nm and having a reduction potential relative to that of N-oxyazinium salt activator is at most 0.1 V more positive.

N-oxyazinium salts have been demonstrated as useful sources of radicals for photoinitiating polymerization. Single electron transfer from an excited electron donor (D*) to an N-oxyazinium salt results in N—O bond cleavage and the formation of an oxy radical, as shown below in Equation (1).

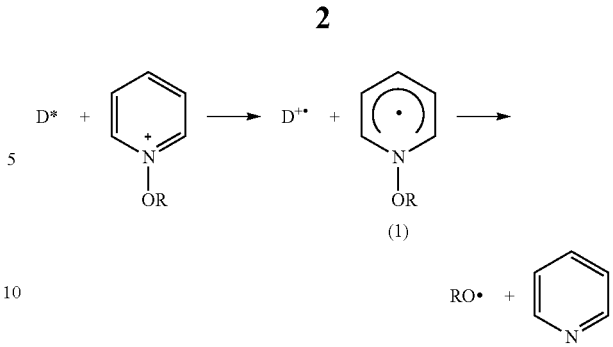

(1)

Although a number of dye-based, as well as, triplet ketocoumarin-based photosensitizing co-initiators have been used to initiate photopolymerization using N-oxyazinium salts, most of them have limited curing speed. This is usually due to overall lower quantum efficiency of the process. The quantum yield of a radiation-induced process is the number of times that a defined event occurs per photon absorbed by the system. The event could be the decomposition of a reactant molecule.

In the case of photopolymerization using N-oxyazinium salts and ketocoumarin triplet photosensitizers, the overall quantum efficiency of oxy radical generation is less than or equal to the triplet formation efficiency (the limiting quantum efficiency being defined as state efficiency for reaction times the quantum yield for formation of the reacting state). With dye-based photosensitizers, the overall quantum efficiency is expected to be even lower due to a shorter lifetime of excited dye.

To increase the overall efficiency of a photocuring process, some degree of amplification is necessary. That is, amplification of photoreactions where one photon leads to the transformation of several reactant molecules to products. In some cases, the commercial viability of certain systems can depend on whether a relatively modest amplification, for example, in the 10 to 100 times range, could be achieved. This depends usually upon limitations on exposure time, light intensity, or a combination that can be imposed on a specific use.

In most known amplified photochemical processes, amplification is based on photochemical generation of a species that is subsequently used to catalyze another reaction. Very few examples of amplified photoreactions are known where one photon leads to the transformation of several reactant molecules to products. Most of these quantum-amplified electron-transfer processes involve radical cation reactions, such as valence isomerization, for example, the transformation of hexamethyldewarbenzene to hexamethylbenzene, or the cyclization or cycloreversion between two olefin moieties and a cyclobutane, where quantum yields as high as several hundred have been obtained in polar solvents. In these reactions, the chain is propagated via electron transfer from a reactant molecule (R) to the radical cation of the product (P.$^+$).

Another type of chain-amplified photoreaction involves two reactants where one is oxidized (leading, for example, to dehydrogenation) and the other is reduced. A different kind of chain reaction involving two reactants is that of onium salts. In these reactions, upon one electron reduction an onium salt (Ar—X$^+$) undergoes fragmentation to yield an aryl radical, which in turn takes a hydrogen atom from an alcohol to give an α-hydroxyl radical. Chain propagation occurs through electron transfer from the α-hydroxyl radical to another onium salt molecule.

Amplified photosensitized electron transfer reactions of N-methoxypyridinium salts with alcohols of diverse structures were recently demonstrated (Shukla et al., *J. Org. Chem.* 70, 6809-6819) to achieve quantum efficiencies of ~10-20, even at modest reactant concentrations of 0.02-0.04 M, and in spite of the endothermicity of the critical electron transfer step from the intermediate α-hydroxy radical to the pyridinium salt. These reactions can be initiated by a number of singlet or triplet sensitizers, with varying degrees of initiation efficiencies that can be as high as 2.

A number of photoinitiators and photoinitiator compositions have been developed and commercialized to carry out free radical chain polymerization. In most of these methods, free radicals are produced by either of two pathways:

(1) the photoinitiator undergoes excitation by energy absorption with subsequent decomposition into one or more radicals, or (2) the photoinitiator undergoes excitation and the excited species interacts with a second compound (by either energy transfer or a redox reaction) to form free radicals from the latter or former compound(s).

Most known photoinitiators have only moderate quantum yields (generally less than 0.4), indicating that the conversion of light radiation to radical formation needs to be made more efficient. Thus, there are continuing opportunities for improvements in the use of photoinitiators in free radical polymerization.

In photopolymerization technology, there still exists a need for highly amplified photochemistry, and easy to prepare and easy to use photoinitiator compositions. The need for amplified photoinitiator compositions is particularly acute where absorption of light by the reaction medium may limit the amount of energy available for absorption by the photoinitiators. For example, in the preparation of color filter resists, highly pigmented resists are required for high color quality. With the increase in pigment content, the curing of color resists becomes more difficult. The same is true for the UV-photocurable inks, for example offset printing inks, which also are loaded with pigments. Hence, there is a need for a photoinitiator composition having a higher sensitivity and excellent resolution properties. In addition, there is a need for such photoinitiator compositions to meet the industrial properties such as high solubility, thermal stability, and storage stability.

Besides the challenges noted above often encountered in free radical curing, there is an additional challenge of free radical photocuring inhibition by the presence of oxygen. Oxygen inhibition has always been a problem for photocuring of acrylate-containing compositions containing multifunctional acrylate monomers or oligomers using a photoinitiated radical polymerization (for example, see Decker et al., *Macromolecules* 18 (1985) 1241). This oxygen inhibition is due to the rapid reaction of carbon centered propagating radicals with oxygen molecules to yield peroxyl radicals. These peroxyl radicals are not as reactive towards carbon-carbon unsaturated double bonds and therefore do not initiate or participate in any photopolymerization reaction. Oxygen inhibition usually leads to premature chain termination that results in incomplete photocuring. Thus, many photocuring processes must be carried out in inert environments (for example, under nitrogen or argon), making such processes more expensive and difficult to use in industrial and laboratory settings.

Various methods have been proposed to overcome oxygen inhibition of photocuring:

(1) Amines that can undergo a rapid peroxidation reaction can be added to consume the dissolved oxygen. However, the presence of amines in acrylate-containing compositions can cause yellowing in the resulting photocured composition, create undesirable odors, and soften the cured composition because of chain transfer reactions. Moreover, the hydroperoxides thus formed will have a detrimental effect on the weathering resistance of the UV-cured composition.

(2) Dissolved oxygen can be converted into its excited singlet state by means of a red light irradiation in the presence of a dye sensitizer. The resulting $^1O_2$ radical will be rapidly scavenged by a 1,3-diphenylisobenzofuran molecule to generate a compound (1,2-dibenzoylbenzene) that can work as a photoinitiator (Decker, *Makromol. Chem.* 180 (1979), p. 2027). However, the photocured composition can become colored, in spite of the photobleaching of the dye, prohibiting this technique for use in various products.

(3) The photoinitiator concentration can be increased to shorten the UV exposure during which atmospheric oxygen diffuses into the cured composition. This technique can also be used in combination with higher radiation intensities. Oxygen inhibition can further be reduced by using high intensity flashes that generate large concentrations of initiator radicals reacting with oxygen, but hydroperoxides are also formed.

(4) Free radical photopolymerization can be carried out under inert conditions (Wight, *J. Polym. Sci.: Polym. Lett. Ed.* 16 (1978) 121), which is the most efficient way to overcome oxygen inhibition. Nitrogen is typically continuously used to flush the photopolymerizable composition during UV exposure. On an industrial UV-curing line, which cannot be made completely airtight, nitrogen losses can be significant, thus making the process expensive and inefficient. This is an even greater concern if argon is used to provide an inert environment.

Other less common ways of overcoming oxygen inhibition of acrylate photopolymerization include using a wax barrier and performing UV exposure under water. Each of these techniques has disadvantages that have made them less likely for commercial application.

Thus, there is a need to provide highly efficient photocuring or photopolymerization of acrylate-containing compositions using N-oxyazinium salts without the need for inert environment or use of other known methods for reducing oxygen inhibition of free radical formation and reaction.

SUMMARY OF THE INVENTION

This invention provides a photocurable composition comprising:

at least one N-oxyazinium salt photoinitiator,
a photosensitizer for the N-oxyazinium salt photoinitiator,
an N-oxyazinium salt efficiency amplifier, and
one or more photocurable acrylates.

This invention also provides a kit comprising:

a) a precursor composition comprising one or more photocurable acrylates, and
b) a photoinitiator composition comprising at least one N-oxyazinium salt photoinitiator, a photosensitizer for the N-oxyazinium salt photoinitiator, and an N-oxyazinium salt efficiency amplifier.

The present invention solves some of difficulties and problems described above by the discovery of a more efficient photoinitiator composition for utilizing radiation in photocuring operations. The photocurable composition of the present invention has high sensitivity and storage stability that is useful in the photopolymerization technology. Accordingly, the photocurable composition of this present invention includes a photoinitiator composition that can generate a reactive species by using in combination, an N-oxyazinium salt photoinitiator, a photosensitizer for the N-oxyazinium salt photoinitiator, and an N-oxyazinium salt efficiency amplifier, which is many embodiments, is an organic phosphite that is also referred to as a quantum yield amplifier.

One of the advantages of the photoinitiator composition is that, when combined with a polymerizable material such as an acrylate, the photoinitiator composition causes rapid curing times in comparison to the curing times known in the prior art. For example, surprisingly, the photoinitiator composition performs unexpectedly better (higher quantum efficiency) than known N-oxyazinium salt-containing photoinitiator compositions. This advantage is achieved particularly by using the N-oxyazinium salt efficiency amplifier that was not previously known to accomplish this purpose. This accomplishes photocuring with an efficient use of the radiation because many reactive species are generated per photon absorbed (that is, amplification) occurs. A relatively large amount of material can be photocured with reduced exposure to radiation.

Yet another important advantage of the present invention is that the photocuring can be carried out in oxygen-containing environments. Because of the high efficiency of the photoinitiator composition, the presence of oxygen, or oxygen inhibition, is not a serious detriment during photocuring.

Because the photocuring speeds are high using the present invention, the photocurable compositions can be pigmented into which light penetration is limited. It is also possible to use the invention for partial curing for example to modify their composition viscosity.

DETAILED DESCRIPTION OF THE INVENTION

Definitions

Unless otherwise indicated, the term "photoinitiator composition" used in this application will refer to embodiments used in the present invention.

The term "polymerization" is used herein to mean the combining for example, by covalent bonding, of large number of smaller molecules, such as monomers, to form very large molecules, that is, macromolecules or polymers. The monomers may be combined to form only linear macromolecules or they may be combined to form three-dimensional macromolecule, commonly referred to as crosslinked polymers.

As used herein, the terms "curing" and "photocuring" mean the polymerization of functional oligomers and monomers, or even polymers, into a crosslinked polymer network. Curing is the polymerization of unsaturated monomers or oligomers in the presence of crosslinking agents.

The terms "unsaturated monomer," "functional oligomer," and "crosslinking agent" are used herein with their usual meanings and are well understood by those having ordinary skill in the art.

The singular form of each component of the photoinitiator composition is intended also to include the plural that is, one or more of the respective components.

The term "unsaturated polymerizable material" is meant to include any unsaturated material having one or more carbon-to-carbon double bonds (ethylenically unsaturated groups) capable of undergoing polymerization. The term encompasses unsaturated monomers, oligomers, and crosslinking agents. The singular form of the term is intended to include the plural. Oligomeric and multifunctional acrylates are examples of unsaturated polymerizable materials.

The term "quantum yield" is used herein to indicate the efficiency of a photochemical process. More particularly, quantum yield is a measure of the probability that a particular molecule will absorb a quantum of light during its interaction with a photon. The term expresses the number of photochemical events per photon absorbed. Thus, quantum yields can vary from zero (no absorption) to a very large number (for example, $10^3$). In this context, the quantum efficiency of an N-oxyazinium salt photoinitiator is defined as in the following equation:

$$\Phi = \text{Quantum Efficiency} = \frac{\text{\# reactant alkoxyl radicals generated}}{\text{\# photons absorbed}}$$

The term "photosensitizer" is meant to refer to a light absorbing compound used to induce photocuring. Upon photoexcitation, the photosensitizer leads to one-electron reduction of the N-oxyazinium salt photoinitiator.

The terms "activator" and "photoinitiator" refer to an N-oxyazinium salt that accepts an electron from an excited sensitizer, a process that leads to fragmentation of the activator to give an oxy radical that initiates polymerization.

The terms "quantum yield amplifier" and "efficiency amplifier" refer to a compound that increases the quantum efficiency of the overall photocuring or photopolymerization process.

The terms "photocurable" and "curable" refer to a material that will polymerize when irradiated for example with radiation such as ultraviolet (UV), visible, or infrared radiation in the presence of the photoinitiator composition. "Actinic radiation" is any electromagnetic radiation that is capable of producing photochemical action and can have a wavelength of at least 150 nm and up to and including 1250 nm, and typically at least 300 nm and up to and including 750 nm.

Uses of the Photoinitiator Compositions

The photoinitiator composition can be used to cause photocuring or polymerization of various photocurable compounds used for coatings, printable inks, paints, photoresists, or any photocurable imaging compositions.

The photoinitiator composition can be used to formulate a photocurable composition of this invention comprised of an organic component containing polymerizable materials that are capable of crosslinking such as acrylate-containing compounds, an N-oxyazinium salt photoinitiator (or activator), a photosensitizer for the N-oxyazinium salt photoinitiator, which photosensitizer has a reduction potential that in relation to the reduction potential of the N-oxyazinium salt photoinitiator, is at most 0.1 volt more positive, and an N-oxyazinium salt efficiency amplifier. Each of the components of the photoinitiator composition is described below and each of these components can be obtained from various commercial chemical suppliers. The photoinitiator composition can be provided in any form that is suitable for the various components or intended use. In most embodiments, the photoinitiator composition is in solid form, such as a powder, granules, or pressed tablet.

Photoinitiator Compositions

The N-oxyazinium salt photoinitiators used in this invention are N-oxy-N-heterocyclic compounds having a heterocyclic nucleus, such as a pyridinium, diazinium, or triazinium nucleus. The N-oxyazinium salt can include one or more aromatic rings, typically carbocyclic aromatic rings, fused with the N-oxy-N-heterocyclic compound, including quinolinium, isoquinolinium, benzodiazinium, phenanthridinium, and naphthodiazinium. Any convenient charge balancing counter-ion can be employed to complete the N-oxyazinium salt photoinitiators, such as halide, fluoroborate, hexafluorophosphate, and toluene sulfonate. The alkoxy group (—O—$R_1$) of the N-oxyazinium compound that quaternizes the ring nitrogen atom of the azinium nucleus can be selected from among a variety of synthetically convenient oxy groups. The N-oxyazinium salt photoinitiators can also be oligomeric or polymeric compounds.

The N-oxyazinium salt photoinitiator can have a reduction potential less negative than −1.4 V and comprise an N-oxy group that is capable of releasing an oxy radical when irradiated of the photocurable composition.

Representative N-oxyazinium salt photoinitiators are represented by the following Structure (I):

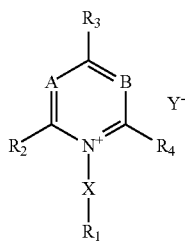

(I)

wherein A and B in Structure (I) independently represent a carbon, C—$R_5$, C—$R_6$, or nitrogen. X is oxygen (O).

$R_1$, $R_2$, $R_3$, $R_4$, $R_5$, and $R_6$ are independently hydrogen, or substituted or unsubstituted alkyl groups having 1 to 12 carbon atoms or aryl groups having 6 or 10 carbon atoms in the carbocyclic ring, which groups can be substituted with one or more acyloxy, alkoxy, aryloxy, alkylthio, arylthio, alkylsulfonyl, thiocyano, cyano, halogen, alkoxycarbonyl, aryloxycarbonyl, acetal, aroyl, alkylaminocarbonyl, arylaminocarbonyl, alkylaminocarbonyloxy, arylaminocarbonyloxy, acylamino, amino, alkylamino, arylamino, carboxy, sulfo, trihalomethyl, alkyl, aryl, heteroaryl, alkylureido, arylureido, succinimido, phthalimido groups, —CO—$R_7$ wherein $R_7$ is a substituted or unsubstituted alkyl or a substituted or unsubstituted aryl group, or —(CH=CH)$_m$—$R_8$ wherein $R_8$ is a substituted or unsubstituted aryl group or a substituted or unsubstituted heterocyclic group.

Any of the A, B, and R groups where chemically feasible can be joined to form a ring. Y is a suitable charge balancing anion that can be a separate charged moiety or a charged part of an A, B, or R group.

Other useful N-oxyazinium salt photoinitiators are represented by the following Structure (II):

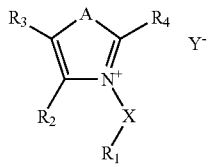

(II)

wherein A in Structure (II) represents carbon, C—$R_5$, nitrogen, sulfur, or oxygen with sufficient bonds and substituents to form a heteroaromatic ring. X is oxygen (O). $R_1$, $R_2$, $R_3$, $R_4$, and $R_5$ are independently hydrogen, or substituted or unsubstituted alkyl or aryl groups as described above for Structure (I), or any two R groups may form a ring. Y is a charge balancing anion that can be a separate charged moiety or part of a charged R group.

In some embodiments of Structures (I) and (II), $R_1$ is a substituted or unsubstituted alkyl group having 1 to 18 carbon atoms or a substituted or unsubstituted aryl group having 6 or 10 carbon atoms in the aromatic ring.

Other useful N-oxyazinium salt photoinitiators having a cation can be represented by the following formulae:

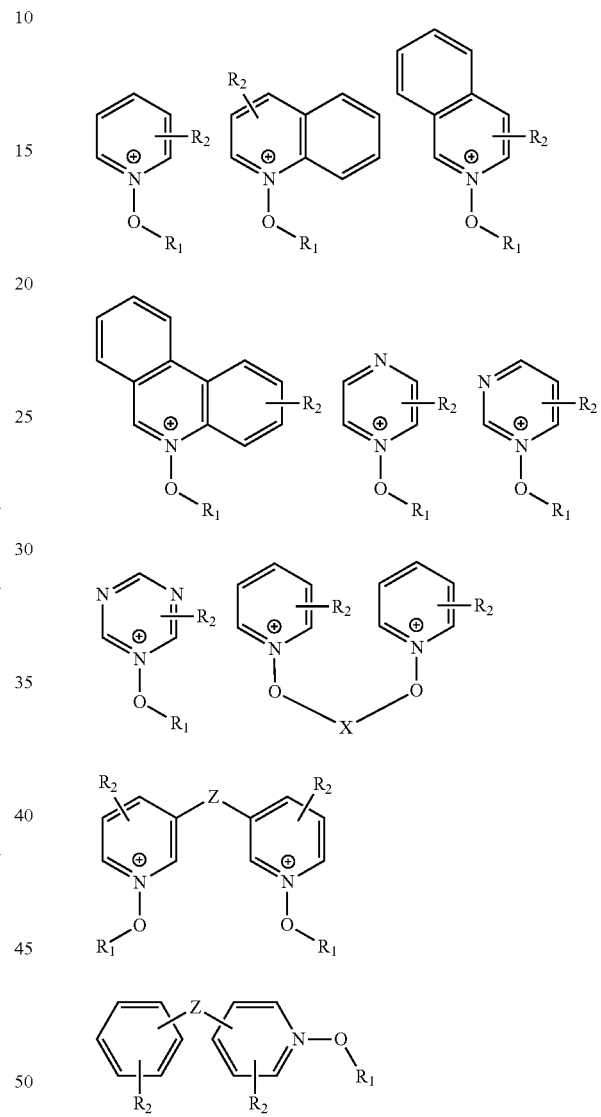

wherein $R_1$ represents a substituted or unsubstituted alkyl group, substituted or unsubstituted aryl group, or an acyl group, as described above, and wherein $R_1$ can also include a charge balancing anion, the $R_2$ groups independently represent hydrogen, or substituted or unsubstituted alkyl, aryl, or heteroaryl groups. Z is a substituted or unsubstituted aliphatic linking group having 1 to 12 atoms in the linking chain.

Other useful N-oxyazinium salt photoinitiators are illustrated by Structures III and IV and the compounds shown in TABLES 1 and 2 of U.S. Pat. No. 7,632,879 (Majumdar et al.) that is incorporated herein by reference for this teaching.

Particularly useful N-oxyazinium salt photoinitiators are compounds OZ-1 to OZ-16 identified below in TABLE I.

TABLE I
OZ-1 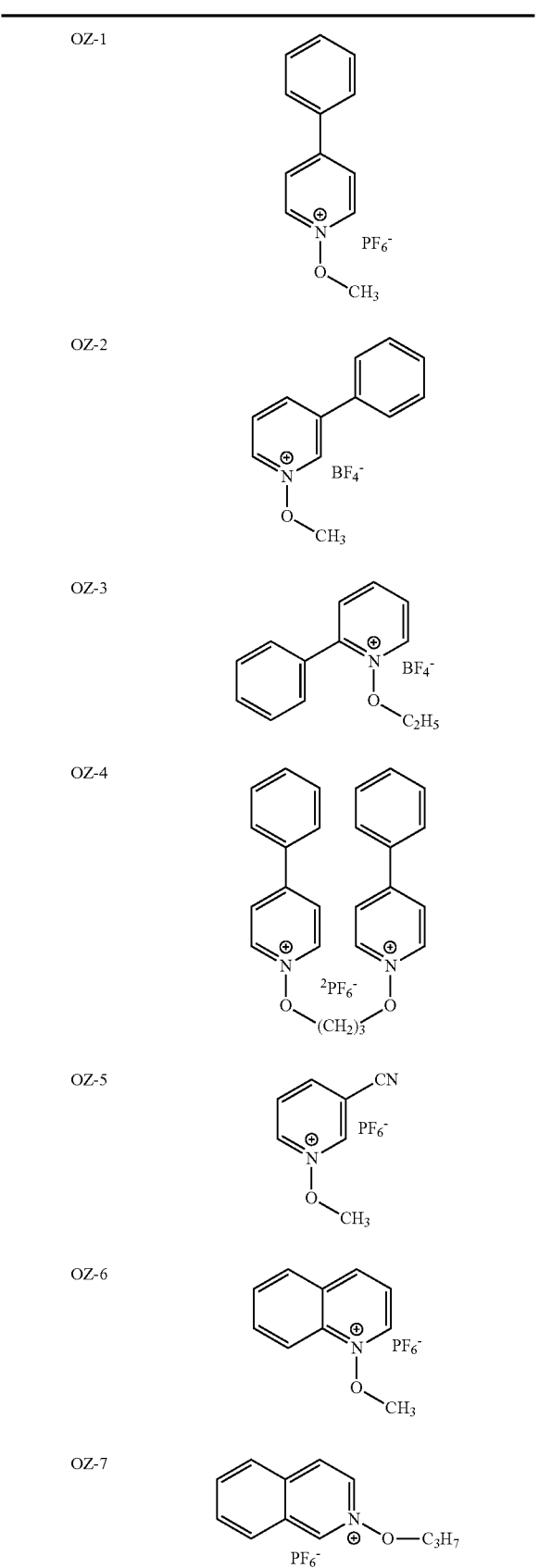
OZ-2
OZ-3
OZ-4
OZ-5
OZ-6
OZ-7
TABLE I-continued
OZ-8 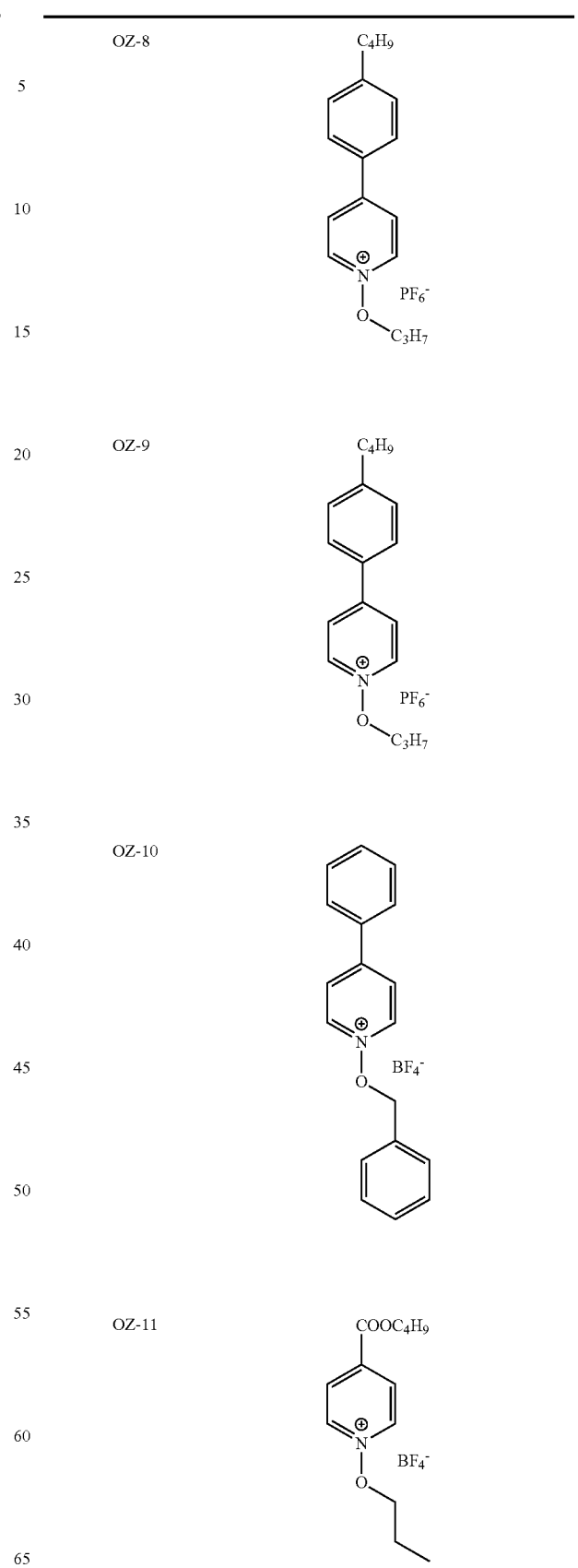
OZ-9
OZ-10
OZ-11

TABLE I-continued

OZ-12 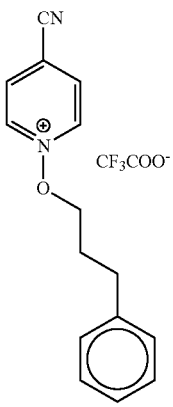

OZ-13 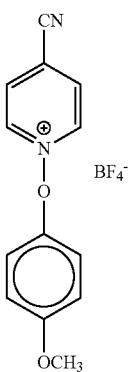

OZ-14 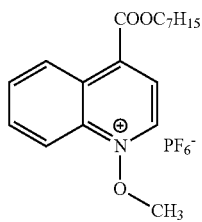

OZ-15 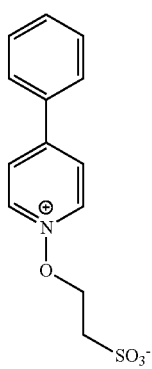

OZ-16 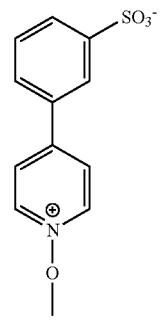

Mixtures of N-oxyazinium salt photoinitiators can be used if desired, and the total amount of N-oxyazinium salt photoinitiators in the photoinitiator composition is generally at least 10 weight %, or typically at least 40 and up to and including 80 weight % based on the total weight of N-oxyazinium salt photoinitiator, photosensitizer for the N-oxyazinium salt photoinitiator, and N-oxyazinium salt efficiency amplifier.

The photosensitizer (S) for the N-oxyazinium salt photoinitiator initiates the reaction of the N-oxyazinium salt photoinitiator following absorption of suitable radiation having a $\lambda_{max}$ of at least 150 and up to and including 1250 nm. The photosensitizer generally has a triplet energy of at least 20 kcal/mole of N-oxyazinium salt photoinitiator. As long as the reduction potential of the photosensitizer is more negative than that of the N-oxyazinium salt photoinitiator (that is, it is harder to reduce), the photoinduced electron transfer reaction will be exothermic. The photoinitiated process produces the reactive oxy radical by electron transfer from the excited state of the photosensitizer (*S) to the N-oxyazinium salt photoinitiator. The oxy radical can subsequently react with the N-oxyazinium salt efficiency amplifier, such as a trialkylphosphite, producing a suitable radical such as a phosphoranyl radical that can in turn transfer an electron to the N-oxyazinium salt photoinitiator to continue the chain process. Mixtures of photosensitizers can be used if desired and the photosensitizers in the mixture can absorb at the same or different wavelengths.

Thus, the photosensitizer is capable of transferring an electron from its own lowest excited state after it has absorbed radiation. The driving force for this process depends upon: (a) the excitation energy of the sensitizer, $(E^{excit})_S$, (b) its oxidation potential, $(E^{ox})_S$, (c) the reduction potential of the N-oxyazinium salt photoinitiator, $(E^{red})_{N\text{-}oxy}$, and (d) an energy increment $\Delta$ that varies from near zero in polar solvents such as acetonitrile to about 0.3 eV in nonpolar media. Thus, for the photoinduced electron transfer to be exothermic (that is, for the energy stored in the excited state to exceed the energy stored in the electron transfer products) the relationships shown in the following Equation 7 should be satisfied:

$$(E^{excit})_S > (E^{ox})_S - (E^{red})_{N\text{-}oxy} + \Delta \qquad (7)$$

The excitation energy of the sensitizer, $(E^{excit})_S$, could be that of the singlet or the triplet state depending on which of these states react with the N-oxyazinium salt photoinitiator.

The amount of photosensitizer used in the photocurable composition depends largely on its optical density at the wavelength(s) of radiation used to initiate the photoinduced electron transfer to an N-oxyazinium salt photoinitiator. Solubility of the photosensitizer in a photocurable composition can also be a factor. It is possible that the photosensitizer is a covalently bound part of a polymerizable material such as an acrylate. Either a photosensitizer bound in this manner or a non-bound photosensitizer with a low extinction coefficient can be utilized at relatively high levels to help facilitate the transfer of an electron to an N-oxyazinium salt photoinitiator from triplet sensitizer ($^3$S). When covalently attached to a polymeric material, the photosensitizer can comprise at least 0.01 and up to and including 10% based on the total weight of the N-oxyazinium salt photoinitiator. An example of such a covalently bound photosensitizer is a naphthalene moiety (that absorbs actinic radiation) that is bound to polymerizable or photocurable material, or it can be attached to an inert polymeric binder. The amount of the photosensitizers is generally governed by their molar absorptivity or extinction coefficient. Photosensitizers that are not bound to curable compounds or polymers can be present in an amount of at least 1 and up to and including 10 weight %, based on the total weight of N-oxyazinium salt photoinitiator, photosensitizer for the N-oxyazinium salt photoinitiator, and N-oxyazinium salt efficiency amplifier.

The triplet energies of the photosensitizers used in this invention can be obtained in a variety of ways. Energies for some photosensitizers or closely related analogs are disclosed in the literature. For most photosensitizers, the lowest triplet state energies can be obtained from low temperature (for example, 77° K) phosphorescence spectra. The photosensitizer is typically dissolved in a solvent (such as ethyl acetate) or a mixture of solvents and the solution is placed in an optical cell and immersed in liquid nitrogen. The photosensitizer is then excited with radiation at a wavelength where it absorbs, and its phosphorescence spectrum is measured. The highest energy absorption band (the so-called 0-0 band) in the phosphorescence spectrum can usually be taken as the energy of the lowest triplet state of the photosensitizer. For photosensitizers with weak or obscured emission or in which the ground state and lowest triplet state have substantial differences in geometry, triplet energies can be obtained either from rates of energy transfer from a series of molecules with known triplet energies or from measured equilibria with triplets of known energies. The former procedure is described in *J. Amer. Chem. Soc.* 102, 2152 (1980) and the latter procedure is described in *J. Phys. Chem.* 78, 196 (1974). In polymer matrices, photosensitizers and other compounds can occupy sites of different polarity, such that exact triplet energies are site dependent. To the extent that this is true for the photosensitizers and co-sensitizers (see below) used in this invention, the reported triplet energies represent approximate or average values.

Especially useful photosensitizers absorb visible light or near ultraviolet light, for example at a wavelength of at least 300 and up to and including 750 nm. The ketocoumarins disclosed in *Tetrahedron* 38, 1203 (1982) represent one class of useful photosensitizers. The ketocoumarins described in U.K. Patent Publication 2,083,832 (Specht et al.) are also useful photosensitizers. The ketocoumarins exhibit very triplet state generation efficiencies.

Other classes of useful photosensitizers include but are not limited to, xanthones, thioxanthones, arylketones, and polycyclic aromatic hydrocarbons.

Examples of specific useful triplet photosensitizers include but are not limited to, compounds S-1 through S-10 shown below in TABLE II. The illustrated photosensitizers can optionally contain substituents as methyl, ethyl, phenyl, aryl, methoxy, and chloro groups to modify various properties such as solubility, absorption spectrum, and reduction potential.

TABLE II

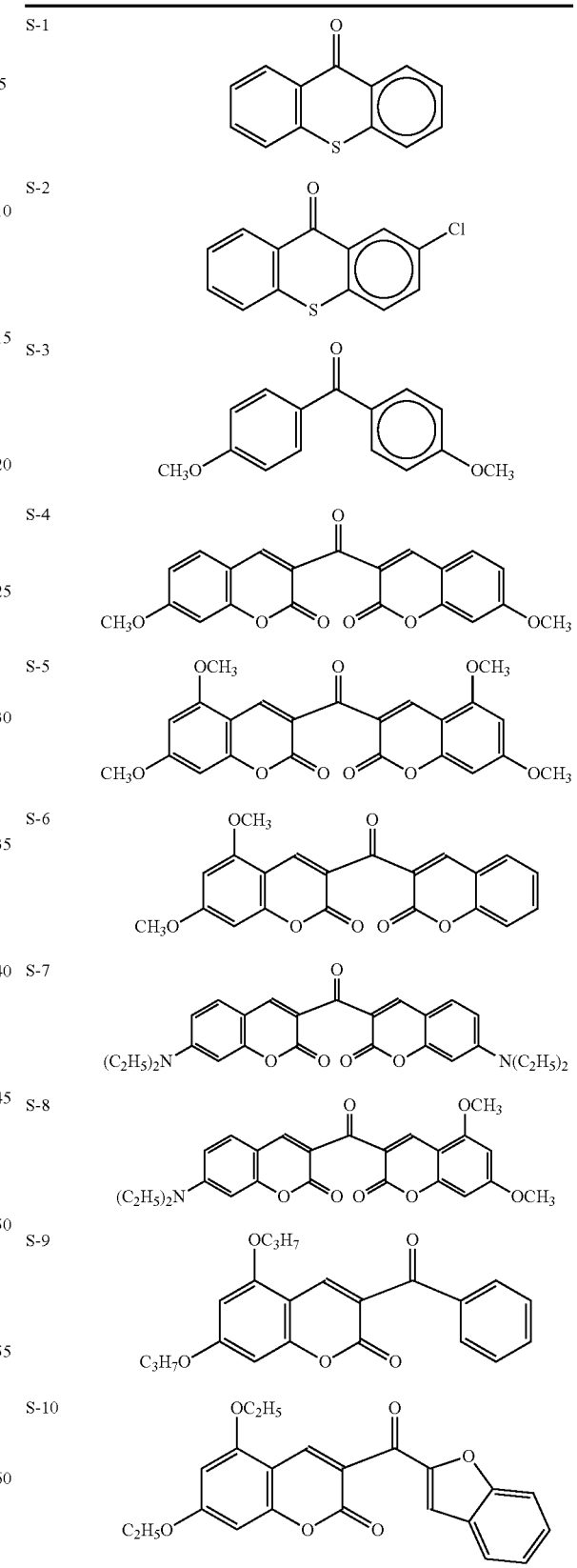

In some embodiments of this invention, the photosensitizer can be a dye, which is any dye that by reaction with an N-oxyazinium salt photoinitiator leads to the formation of an oxy radical, which initiates polymerization. The useful classes of photosensitizer dyes can be for example, cyanine dyes, complex cyanine dyes, merocyanine dyes, complex merocyanine dyes, homopolar cyanine dyes, styryl dyes, oxonol dyes, hemioxonol dyes, hemicyanine dyes, squarilium dyes, coumarin dyes, rhodamine dyes, acridine dyes, and oxanol dyes. Representative photosensitizer dyes are described for example in *Research Disclosure*, Item 36544, September 1996, the disclosure of which is incorporated herein by reference. Some useful photosensitizer dyes are described in U.S. Pat. No. 4,743,530 (noted above) that is incorporated herein by reference. In general, any dye having a reduction potential that is at most 0.1 V more positive than the reduction potential of an N-oxyazinium salt photoinitiator can be effectively used as a photosensitizer.

Particularly useful photosensitizing cyanine or merocyanine dyes are shown by the general formulae D-1 to D-7 below in TABLE III.

TABLE III

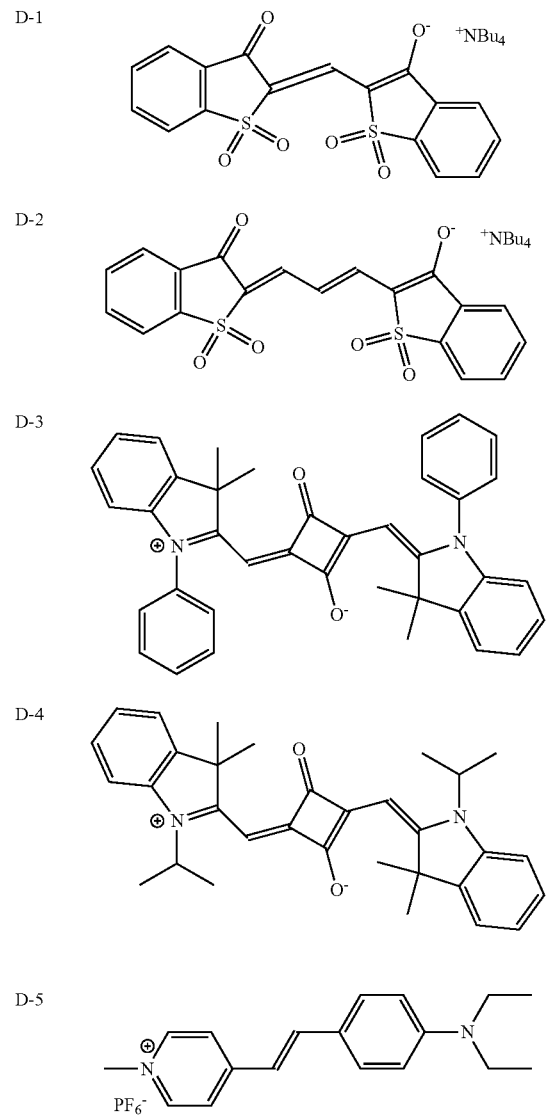

TABLE III-continued

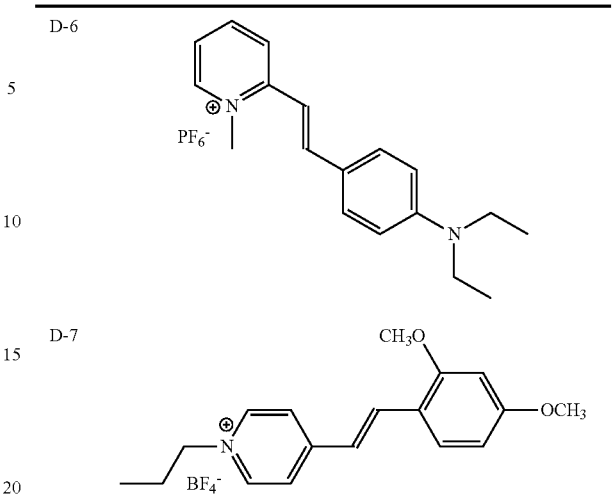

The photocurable composition of this invention includes one or more N-oxyazinium salt efficiency amplifiers. In most embodiments, these efficiency amplifiers are phosphites such as organic phosphites.

In general, the phosphite can be represented by the formula:

$$(R'O)_3P$$

wherein the multiple R' groups are the same or different substituted or unsubstituted alkyl groups or substituted or unsubstituted $HO[\{CH(R)\}_xO]_y$ groups wherein the multiple R groups are the same or different hydrogen atoms or substituted or unsubstituted alkyl groups, or two R' groups can form a substituted or unsubstituted cyclic aliphatic ring or fused ring system, x is a number at least 2 and up to and including 20, and y is at least 1 and up to and including 20.

The photoinitiator composition can comprise one or more of trimethyl phosphite, triethyl phosphite, tripropyl phosphite, tributyl phosphite, triisobutyl phosphite, triamyl phosphite, trihexyl phosphite, trinonyl phosphite, tri-(ethylene glycol) phosphite, tri-(propylene glycol) phosphite, tri-(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, and tri-(polybutylene glycol) phosphite as N-oxyazinium salt efficiency amplifiers.

The N-oxyazinium salt efficiency amplifier, especially when it is a phosphite, is present at a molar ratio to the N-oxyazinium salt photoinitiator of at least 0.001:1 and up to and including 10:1, or typically of at least 1:1 and up to and including 5:1.

Photocurable Compositions

The photoinitiator compositions can be used to prepare photocurable compositions by simply mixing, under "safe light" conditions, the photoinitiator composition, or individually, the N-oxyazinium salt photoinitiator, a photosensitizer for the N-oxyazinium salt photoinitiator, and an N-oxyazinium salt efficiency amplifier, with a suitable photocurable acrylate or other photocurable compound. This mixing can occur in suitable inert solvents if desired. Examples of suitable solvents include but are not limited to, acetone, methylene chloride, and any solvent that does not react appreciably with the phosphite, N-oxyazinium salt photoinitiator, or photosensitizer.

A liquid organic material to be polymerized or photocured (such as an acrylate) can be used as the solvent for mixing, or it can be used in combination with another liquid. An inert solvent can be used also to aid in obtaining a solution of the materials and to provide suitable viscosity to the photocurable compositions for coatings, ink jet inks, or other materials or operations. However, solvent-free photocurable compositions also can be prepared by simply dissolving the N-oxyazinium salt photoinitiator, the efficiency amplifier, and photosensitizer in the organic photocurable material with or without mild heating.

Photocurable acrylates can be monomers, oligomers, or polymers containing one or more acrylate groups in the molecule. Such compounds include but are not limited to, various compounds having one or more ethylenically unsaturated polymerizable groups.

In some embodiments, the photocurable acrylate also includes the photosensitizer for the N-oxyazinium salt photoinitiator in the same molecule. For example, such photosensitizers can be ketocoumarin moieties that are parts of molecules that also include acrylate groups.

In other embodiments, the photocurable resins have a weight average molecular weight of at least 100,000.

In the photocurable compositions, a photosensitizer can be present in an amount of at least $5 \times 10^{-7}$ and up to and including $1 \times 10^{-4}$, or at least $10^{-6}$ and up to and including $5 \times 10^{-5}$, or more typically at least $2 \times 10^{-5}$ and up to and including $2 \times 10^{-4}$, moles per gram of photocurable acrylate.

N-oxyazinium salt photoinitiator concentrations in the photocurable composition can be specified in terms of moles of N-oxyazinium salt photoinitiator per gram of photocurable acrylate. Typical concentrations of N-oxyazinium salt photoinitiator are at least $6 \times 10^{-7}$ and up to and including $6 \times 10^{-2}$, or typically at least $6 \times 10^{-6}$ and up to and including $6 \times 10^{-2}$, or more typically at least $6 \times 10^{-4}$ and up and including $60 \times 10^{-2}$ moles per gram of photocurable acrylate.

In addition, the efficiency amplifier, such as a phosphite, can be present in the photocurable composition in an amount of at least $5 \times 10^{-7}$ and up to and including $1 \times 10^{-2}$, typically at least $10^{-6}$ and up to and including $5 \times 10^{-2}$, or more typically at least $10^{-4}$ and up to and including $5 \times 10^{-2}$ moles per gram of N-oxyazinium salt photoinitiator. The use of larger amounts of efficiency amplifier phosphite is possible.

The photoinitiator composition can be included as part of kit that also includes a precursor composition comprising one or more photocurable acrylates. In such kits, each component is separately packaged until it is needed, and each component can be in solid form, or the precursor composition can be in liquid form and the photoinitiator composition can be in solid form. These kit components can then be combined to form a photocurable composition.

Evaluation of useful photoinitiator compositions as initiating systems for photopolymerization or photocuring can be carried out using an acrylate-based coating formulation (see Examples below). Irradiation to initiate photocuring can be carried out using a filtered mercury lamp output through a band-pass filter. This is just one source of useful radiation. The efficiency of photopolymerization can be determined by the amount of photocrossliked polymer retained after solvent development, which leaves behind only the areas that had sufficient exposure to cause crosslinking of the photocurable acrylates. Thus, a more efficient photoinitiator composition can create more crosslinked polymer than a less efficient photoinitiator composition.

Method of Using Photoinitiator Compositions

A method of photocuring an acrylate-containing composition (such as a precursor composition) comprises:

mixing at least one N-oxyazinium salt photoinitiator, a photosensitizer for the N-oxyazinium salt photoinitiator, an N-oxyazinium salt efficiency amplifier, and one or more photocurable acrylates to form a photocurable composition, and irradiating the photocurable composition using suitable radiation adapted for the particular composition, to effect polymerization of the one or more acrylates.

The irradiating step can be carried out in the presence of oxygen, or it can be carried out in an inert (for example, nitrogen or argon) environment. The photocurable composition can be partially or completely cured during the irradiating step, depending upon the use of the resulting "cured" composition. For example, in one use, the photocurable composition can be partially cured to increase its viscosity. Thus, the photocurable composition can be jetted out of a nozzle before partial curing from the irradiating step to modify the viscosity of the photocurable composition. The partially cured photocurable composition can then be completed cured in a second curing step, for example, after it has been applied to a substrate.

In general, the irradiating step is carried out using radiation having a wavelength of at least 150 nm or typically at least 300 nm and up to and including 1250 nm. More typically, the irradiation is at a wavelength of at least 300 nm and up to and including 750 nm.

As noted above, the photocurable composition can mixed in the form of a solution in a solvent that is an inert material, or the photocurable composition is mixed as a solution with at least one photocurable acrylate acting as the solvent.

In some embodiments, the photocurable composition is applied to a substrate before the irradiating step. Such substrates include but are not limited to paper, plastic films, glass, ceramics, metals, composites, fabrics, or porous or non-porous surfaces, so that the photocurable composition can be applied and cured in various industries to provide hardened surfaces.

In other embodiments, the photocurable composition is put into a mold before the irradiating step, and the cured composition is then extracted from the mold. This would enable a user to prepare cured or photopolymerized articles of various shapes and sizes.

The present invention provides at least the following embodiments and combinations thereof, but other combinations of features are considered to be within the present invention as a skilled artisan would appreciate from the teaching of this disclosure:

1. A photocurable composition comprising: at least one N-oxyazinium salt photoinitiator, a photosensitizer for the N-oxyazinium salt photoinitiator, an N-oxyazinium salt efficiency amplifier, and one or more photocurable acrylates.
2. The photocurable composition of embodiment 1 wherein the N-oxyazinium salt efficiency amplifier is a phosphite.
3. The photocurable composition of embodiment 1 or 2 wherein the N-oxyazinium salt efficiency amplifier is an organic phosphite having the formula:

wherein the multiple R' groups are the same or different alkyl groups or $HO[\{CH(R)\}_xO]_y$ groups wherein the multiple R groups are the same or different hydrogen atoms or alkyl groups, or two R' groups can form a cyclic aliphatic ring or fused ring system, x is a number at least 2 and up to and including 20, and y is at least 1 and up to and including 20.

4. The photocurable composition of any of embodiments 1 to 3 comprising one or more of trimethyl phosphite, triethyl phosphite, tripropyl phosphite, tributyl phosphite, triisobutyl phosphite, triamyl phosphite, trihexyl phosphite, trinonyl phosphite, tri-(ethylene glycol) phosphite, tri-(propylene glycol) phosphite, tri(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, and tri-(polybutylene glycol) phosphite as N-oxyazinium salt efficiency amplifiers.

5. The photocurable composition of any of embodiments 1 to 4 wherein the N-oxyazinium salt efficiency amplifier is a phosphite that is present at a molar ratio to the N-oxyazinium salt photoinitiator is at least 0.001:1 and up to and including 10:1.

6. The photocurable composition of any of embodiments 1 to 5 wherein the N-oxyazinium salt photoinitiator is represented by either of the following Structures (I) and (II):

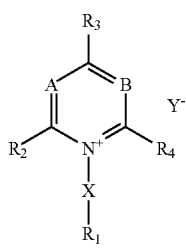

(I)

wherein A and B in Structure (I) independently represent a carbon, C—$R_5$, C—$R_6$ or nitrogen, X is O, $R_1$, $R_2$, $R_3$, $R_4$, $R_5$, and $R_6$ are independently hydrogen, or alkyl or aryl groups, any of the A, B, and R groups where chemically feasible can be joined to form a ring, and Y is a charge balancing anion that can be a separate moiety or part of an A, B, or R,

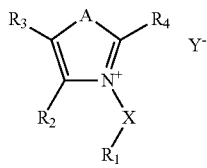

(II)

wherein A in Structure (II) represents a carbon, C—$R_5$, nitrogen, sulfur or oxygen atom with sufficient bonds and substituents to form a heteroaromatic ring, X is O, $R_1$, $R_2$, $R_3$, $R_4$, and $R_5$ are independently hydrogen, or alkyl or aryl groups, or any two R groups may form a ring, and Y is a charge balancing anion that can be a separate moiety or part of an R group.

7. The photocurable composition of embodiment 6 wherein $R_1$ is an alkyl group having 1 to 18 carbon atoms or an aryl group having 6 or 10 carbon atoms in the aromatic ring.

8. The photocurable composition of any of embodiments 1 to 7 wherein the N-oxyazinium salt photoinitiator has a cation represented by one of the following formulae:

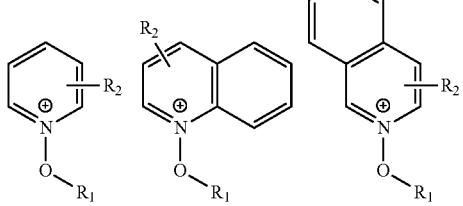

-continued

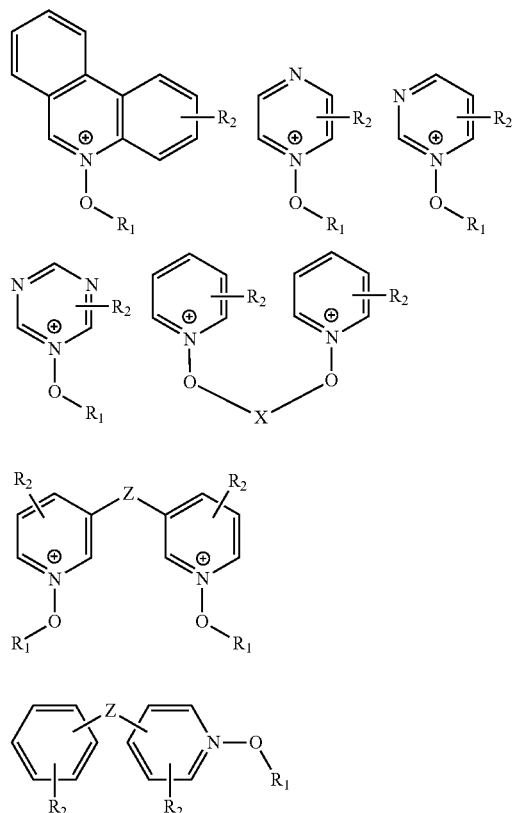

wherein $R_1$ represents a substituted or unsubstituted alkyl group, substituted or unsubstituted aryl group, or an acyl group, wherein $R_1$ can also include a charge balancing anion, the $R_2$ groups independently represent hydrogen, or a substituted or unsubstituted alkyl, aryl, or heteroaryl group, X is a divalent linking group, and Z is an alkylidene group.

9. The photocurable composition of any of embodiments 1 to 8 wherein the N-oxyazinium salt photoinitiator has a reduction potential less negative than −1.4 V and comprises an N-oxy group that is capable of releasing an oxy radical during irradiation of the photocurable composition.

10. The photocurable composition of any of embodiments 1 to 9 comprising one or more of the compounds OZ-1 to OZ-16 identified below:

OZ-1

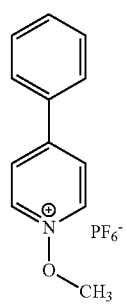

-continued
OZ-2
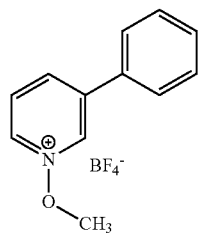
OZ-3
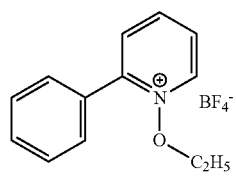
OZ-4
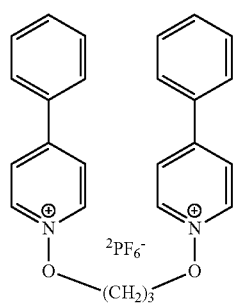
OZ-5
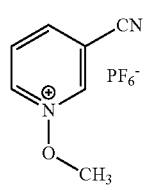
OZ-6
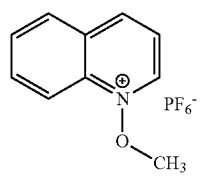
OZ-7
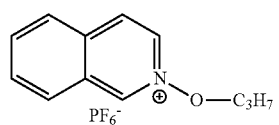
OZ-8
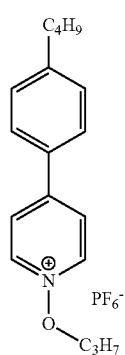
-continued
OZ-9
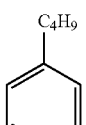
OZ-10
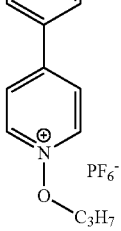
OZ-11
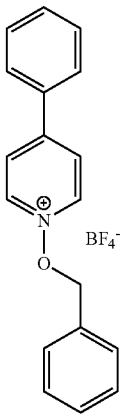
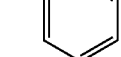
OZ-12
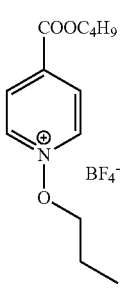
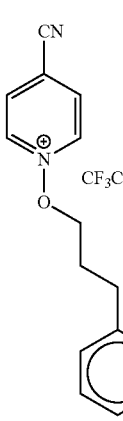
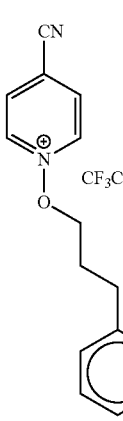

-continued

OZ-13

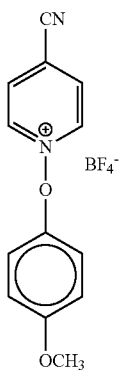

OZ-14

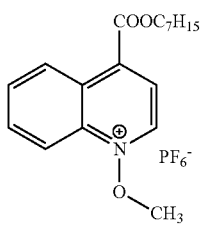

OZ-15

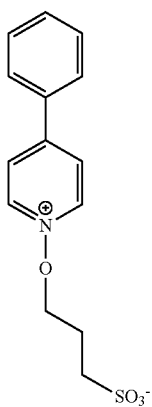

OZ-16

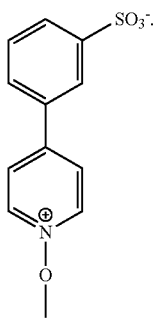

11. The photocurable composition of any of embodiments 1 to 10 comprising the N-oxyazinium salt photoinitiator in an amount of at least $6 \times 10^{-7}$ and up to and including $6 \times 10^{-2}$ moles per gram of photocurable acrylate.

12. The photocurable composition of any of embodiments 1 to 11 wherein the photosensitizer is present in an amount of at least $5 \times 10^{-7}$ and up to and including $1 \times 10^{-4}$ moles per gram of photocurable acrylate.

13. The photocurable composition of any of embodiments 1 to 12 wherein the photosensitizer for the N-oxyazinium salt photoinitiator has a triplet energy of at least 20 kcal/mole of N-oxyazinium salt photoinitiator.

14. The photocurable composition of any of embodiments 1 to 13 wherein the photosensitizer for the N-oxyazinium salt photoinitiator absorbs radiation having a $\lambda_{max}$ of at least 150 nm and up to and including 1250 nm.

15. The photocurable composition of any of embodiments 1 to 14 wherein the photosensitizer for the N-oxyazinium salt photoinitiator is a ketocoumarin, xanthone, thioxanthone, arylketone, or polycyclic aromatic hydrocarbons.

16. The photocurable composition of any of embodiments claims 1 to 14 wherein the photosensitizer for the N-oxyazinium salt photoinitiator is a cyanine or merocyanine dye.

17. The photocurable composition of any of embodiments 1 to 16 wherein the photocurable acrylate is a monomeric material.

18. The photocurable composition of any of embodiments 1 to 17 wherein the photocurable acrylate comprises the photosensitizer for the N-oxyazinium salt photoinitiator.

19. The photocurable composition of any of embodiments 1 to 18 wherein the photocurable acrylate is a photocurable resin having a weight average molecular weight of at least 100,000.

20. A kit comprising:
a) a precursor composition comprising one or more photocurable acrylates, and
b) a photoinitiator composition comprising at least one N-oxyazinium salt photoinitiator, a photosensitizer for the N-oxyazinium salt photoinitiator, and an N-oxyazinium salt efficiency amplifier.

21. The kit of embodiment 20 wherein the N-oxyazinium salt efficiency amplifier is an organic phosphite that is present in the photoinitiator composition at a molar ratio to the N-oxyazinium salt photoinitiator is at least 0.001:1 and up to and including 10:1.

22. The kit of embodiment 20 or 21 wherein the precursor composition is in liquid form and the photoinitiator composition is in solid form.

23. The kit of embodiment 20 or 21 wherein both precursor composition and photoinitiator composition are in solid form.

The following Examples are provided as an illustration of the practice of this invention. These Examples show the effect of the added photoinitiator efficiency amplifier, that is a phosphite in most embodiments of the present invention, on the overall quantum yield of decomposition of N-oxyazinium salt via photoinduced electron transfer from a photosensitizer.

Comparative Example 1

Quantum yield of 2-chlorothioxanthone (S-2) photosensitized reaction of N-methoxy-4-phenylpyridinium hexafluorophosphate (OZ-1) in acetonitrile-$d_3$:

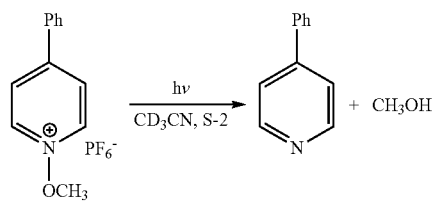

The 2-chlorothioxanthone (S-2) (0.002 moles) sensitizer was added to a 3 ml solution of 0.02 molar N-methoxy-4-phenylpyridinium hexafluorophosphate (OZ-1) in acetonitrile-$d_3$. In a 1×1 cm quartz cell, this solution was purged with a thin stream of argon for 2-3 minutes and then irradiated at 405 nm for 5 minutes. Argon or nitrogen was continuously passed through the reaction mixture during photolysis to purge as well as stir the solution. After photolysis, a $^1$H NMR spectrum of the photolysate was recorded and the percent conversion of the starting materials was determined by integration of diagnostic signals. For example, before photolysis the $^1$H NMR spectrum of a solution of N-methoxy-4-phenylpyridinium hexafluorophosphate and a catalytic amount of 2-chlorothioxanthone in acetonitrile-$d_3$ shows characteristic signals due to the N-methoxypyridinium salt OZ-1 [δ: 8.94 (m, 2H), 8.35 (m, 2H), 7.94 (m, 2H), 7.69 (m, 3H), and 4.43 (s, 3H)]. After irradiation at 405 nm for about 2 minutes, the $^1$H NMR spectrum of the photolysate clearly showed appearance of new diagnostic signals due to formation of 4-phenylpyridine [δ: 8.71 (m, 2H) and 8.26 (m, 2H) and CH$_3$OH (δ: 3.30)]. The identity of these products was established by comparison with $^1$H NMR spectra of authentic samples. The yields of the photo-products were determined from quantitative integration of diagnostic signals of starting materials, N-methoxy-4-phenylpyridinium (OZ-1), and product, 4-phenylpyridine, in $^1$H NMR spectra of the reaction mixtures. Conversions were kept between 15-20% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. J. Am. Chem. Soc. 1966, 88, 2893). The light intensity was within 7-10×10$^{-8}$ Einsteins min$^{-1}$. The quantum yield of reaction was determined by dividing the moles of photoproduct formed by total light intensity and is shown below in TABLE IV.

Invention Example 1

Amplified quantum yield of 2-chlorothioxanthone (S-2) photosensitized reaction of N-methoxy-4-phenylpyridinium hexafluorophosphate (OZ-1) and triethylphosphite in acetonitrile-$d_3$:

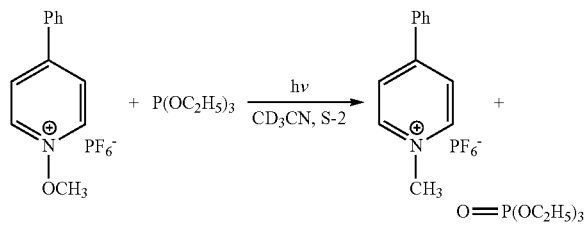

The 2-chlorothioxanthone (S-2) (0.002 moles) sensitizer was added to a 3 ml solution of 0.02 molar N-methoxy-4-phenylpyridinium hexafluorophosphate (OZ-1) and 0.02 M triethylphosphite in acetonitrile-$d_3$. In a 1×1 cm quartz cell, this solution was purged with a thin stream of argon for 2-3 minutes and then irradiated at 405 nm for 30 seconds. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals. Before photolysis, the $^1$H NMR spectrum of an solution of OZ-1, triethylphosphite and a catalytic amount of 2-chlorothioxanthone in acetonitrile-$d_3$ shows characteristic signals due to the N-methoxypyridinium salt (δ: 8.94 (m, 2H), 8.35 (m, 2H), 7.94 (m, 2H), 7.69 (m, 3H), and 4.43 (s, 3H)), triethylphosphite ((δ: 3.84 (quintet, 6H), 1.23 (t, 9H)). After irradiation at 405 nm for about 30 seconds, the $^1$H NMR spectrum of the photolysate clearly showed appearance of new diagnostic signals due to formation of 4-phenylpyridine (δ: 8.71 (m, 2H) and 8.26 (m, 2H) and triethylphosphite (δ: 4.06 (quintet, 6H) and 1.30 (t, 9H)), N-methyl-4-phenylpyridinium (δ: 4.30 (s, 3H)). The identity of these products was established by comparison with $^1$H NMR spectra of authentic samples. The yields of the photoproducts were determined from quantitative integration of $^1$H NMR spectra of the reaction mixtures containing products N-methyl-4-phenylpyridinium signal at δ: 4.30 relative to starting material N-methoxy signal of OZ-1 at δ: 4.43, as well as signals due to product triethylphosphate at δ: 4.06 relative to starting material triethylphosphite at δ: 3.84. Conversions were kept between 15-20% to minimize any secondary photolysis of the products. The photon flux at the excitation wavelengths, 405 nm, was determined by using the known photocycloaddition reaction of phenanthrenequinone to trans-stilbene in benzene as an actinometer (Bohning, J. J.; Weiss, K. J. Am. Chem. Soc. 1966, 88, 2893). The light intensity was within 7-10×10$^{-8}$ Einsteins min$^{-1}$. The quantum yield of reaction was determined by dividing the moles of photoproducts formed by total light intensity and is shown below in TABLE IV.

Invention Example 2

Amplified quantum yield of 2-chlorothioxanthone (S-2) photosensitized reaction of N-methoxy-4-phenylpyridinium hexafluorophosphate (OZ-1) and triethylphosphite in acetonitrile-$d_3$:

This example shows effect of the concentration of the N-oxyazinium salt OZ-1 on the quantum yield. The 2-chlorothioxanthone (S-2) (0.002 moles) sensitizer was added to a 3 ml solution of 0.04 molar N-methoxy-4-phenylpyridinium hexafluorophosphate (OZ-1) and 0.02 molar triethylphosphite in acetonitrile-$d_3$. In a 1×1 cm quartz cell, this solution was purged with a thin stream of argon for 2-3 minutes and was then irradiated at 405 nm for 10-30 seconds minutes. Argon or nitrogen was continuously passed through the reaction mixture during photolysis to purge as well as stir the solution. After photolysis, $^1$H NMR spectrum of the photolysate was recorded and the percent conversion of the starting materials was determined by integration of diagnostic signals as described above. The quantum yield of reaction was determined by dividing the moles of photoproducts formed by total light intensity and is shown below in TABLE IV.

TABLE IV

Reaction of Triplet Sensitized Reaction of N-Oxyazinium Salts with and without Phosphite: Effect of Concentration of N-Oxyazinium on Quantum Yields

| | | Amount of Triethylphosphite | Quantum Yield |
|---|---|---|---|
| Comparative Example 1 | 0.002 molar S-2 + 0.02 molar OZ-1 | 0 | 0.95 |
| Invention Example 1 | 0.002 molar S-2 + 0.02 molar OZ-1 | 0.02 molar | 30.0 |
| Invention Example 2 | 0.002 molar S-2 + 0.04 molar OZ-1 | 0.02 molar | 70.0 |

The data in TABLE IV clearly show that the quantum yields of reaction of N-oxyazinium salt OZ-1, by photoinduced electron transfer from S-2, are greatly amplified in the presence of the added triethylphosphite relative to Comparative Example 1 when no triethylphosphite was added.

The unexpected curing speed produced by the photoinitiator compositions of the present invention is best understood by comparing their performance, when used with an efficiency amplifier phosphite, to their performance when used without one. A series of photocurable polymerizable mixtures containing invention photoinitiator compositions were formulated and compared with photocurable mixtures containing only N-oxyazinium salt and photosensitizer. Photocurable polymerizable mixtures were formulated as described below in Comparative Example 2 and Invention Example 3.

The following examples demonstrate the cure efficiency of photoinitiator composition of the present invention for photocuring an acrylate-containing composition in air.

Comparative Example 2

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (14.2 mg, $5.7 \times 10^{-5}$ moles), and 4-phenyl-N-methoxypyridinium hexafluorophosphate N-oxyazinium salt OZ-1 (40.5 mg, $1.2 \times 10^{-4}$ moles) were added and dissolved at room temperature. Each formulation was then coated onto a glass plate and exposed to 405 nm radiation in air. After this irradiation, the samples were washed with acetone and the cure efficiency was measured in terms of the amount of crosslinked polymer left. The results are summarized in TABLE V below.

Invention Example 3

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ moles), and 4-phenyl-N-methoxypyridinium hexafluorophosphate N-oxyazinium salt OZ-1 (40.5 mg, $1.2 \times 10^{-4}$ moles) were added and dissolved at room temperature. The mixture was split in two equal parts and in a second part, triethylphosphite efficiency amplifier (63 mg, $7.7 \times 10^{-4}$ moles) was added. The formulation was then coated onto a glass plate and exposed to 405 nm radiation in air. After irradiation, the sample was washed with acetone and the cure efficiency measured in terms of the amount of crosslinked polymer left. The results are summarized below in TABLE V.

TABLE V

Effect of Efficiency Phosphite on Photocuring in Air

|  | Degree of Curing | Material left after Solvent Wash? |
| --- | --- | --- |
| Comparative Example 2 | No | No |
| Invention Example 3 | Extensive curing | Yes |

These results clearly show that in the presence of the efficiency amplifier phosphite, photocuring of the polymerizable composition was quite extensive relative to Comparative Example 2.

The following Comparative Example 3 and Invention Example 4 compare the photocuring speed of an invention photoinitiator composition containing an efficiency amplifier phosphate with a composition containing no efficiency amplifier.

Comparative Example 3

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ moles), and 4-phenyl-N-methoxypyridinium hexafluorophosphate N-oxyazinium salt OZ-1 (40.5 mg, $1.2 \times 10^{-4}$ moles) were added and dissolved at room temperature. The formulation was then coated onto a glass plate and exposed to 405 nm radiation under $N_2$. After irradiation, the sample was washed with acetone and cure efficiency measured in terms of the amount of crosslinked polymer left. The results are summarized in TABLE VI.

Invention Example 4

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (12.2 mg, $5.7 \times 10^{-5}$ moles), and 4-phenyl-N-methoxypyridinium hexafluorophosphate N-oxyazinium salt OZ-1 (40.5 mg, $1.2 \times 10^{-4}$ moles) were added and dissolved at room temperature and triethylphosphite efficiency amplifier (500 mg, 0.30 moles) was added to the formulation. The formulation was then coated onto a glass plate and exposed to 405 nm radiation under $N_2$. After irradiation, the sample was washed with acetone and the cure efficiency was measured in terms of the amount of crosslinked polymer left. The results are summarized below in TABLE VI.

TABLE VI

Effect of Efficiency Amplifier Triethylphosphite on Cure Speed

| Photoinitiator Composition | Dose Required for Complete Photocuring |
| --- | --- |
| Comparative Example 3 OZ-1 + S-2 | 90 mJ/cm$^2$ |
| Invention Example 4 OZ-1 + S-2 + Triethylphosphite | 5 mJ/cm$^2$ |

These results clearly show that in the use of the efficiency amplifier provided quite rapid photocuring of the polymerizable composition (by a factor of 18) relative to the photoinitiator composition used in Comparative Example 3.

Comparative Example 4

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (14.2 mg, $5.7 \times 10^{-5}$ moles), and 3-phenyl-N-methoxypyridinium tetrafluoroborate N-oxyazinium salt OZ-2 (33 mg, $1.2 \times 10^{-4}$ moles) were added and dissolved at room temperature. The formulation was then coated onto a glass plate and exposed to 405 nm radiation in air. After exposure, the sample was washed with acetone and the cure efficiency was measured in terms of the amount of crosslinked polymer left. The results are summarized below in TABLE VII.

Invention Example 5

To a mixture of multifunctional acrylates (10 g, 8:2 by weight mixture of polyethylene glycol 200 diacrylate (SR259) and dipentaerythritol pentaacrylate ester (SR399) (both from Sartomer), 2-chlorothioxanthone photosensitizer S-2 (14.2 mg, $5.7 \times 10^{-5}$ moles), and 3-phenyl-N-methoxypyridinium tetrafluoroborate N-oxyazinium salt OZ-2 (33 mg, $1.2 \times 10^{-4}$ moles) were added and dissolved at room temperature. The mixture was split into two equal parts and in second part the triisopropylphosphite efficiency amplifier (79 mg, $7.5 \times 10^{-4}$ moles) was added. The formulation was then coated onto a glass plate and exposed to 405 nm radiation in air. After irradiation, the sample was washed with acetone and the cure efficiency was measured in terms of the amount of crosslinked polymer left. The results are summarized below in TABLE VII.

TABLE VII

Effect of Efficiency Amplifier Phosphite on Photocuring in Air

| Photoinitiator Composition | Extent of Curing | Material left after Solvent Wash? |
|---|---|---|
| Comparative Example 4 OZ-2 + S-2 | No | No |
| Invention Example 5 OZ-2 + S-2 + Triisopropylphosphite | Extensive | Yes |

These results also show the considerable improvement in photocuring in air when the photoinitiator composition of the invention was used compared to the Comparative Example 4 composition that did not contain an efficiency amplifier for the N-oxyazinium salt.

Comparative Example 5

To a mixture of multifunctional acrylates (10 g, 8:2 by weight mixture of polyethylene glycol 200 diacrylate (SR259) and dipentaerythritol pentaacrylate ester (SR399) (both from Sartomer), ketocoumarin photosensitizer S-9 (12.2 mg, $3 \times 10^{-5}$ moles), and 4-phenyl-N-methoxypyridinium hexafluorophosphate N-oxyazinium salt OZ-1 (40.5 mg, $1.2 \times 10^{-3}$ moles) were added and dissolved at room temperature. The formulation was then coated onto a glass plate and exposed to 365 nm radiation in air. After irradiation, the sample was washed with acetone and the cure efficiency was measured in terms of the amount of crosslinked polymer left. The results are summarized below in TABLE VIII.

Invention Example 6

To a mixture of multifunctional acrylates (10 g, 8:2 by weight mixture of polyethylene glycol 200 diacrylate (SR259) and dipentaerythritol pentaacrylate ester (SR399) (both from Sartomer), ketocoumarin photosensitizer S-9 (12.2 mg, $3 \times 10^{-5}$ moles), and 4-phenyl-N-methoxypyridinium hexafluorophosphate N-oxyazinium salt OZ-1 (40.5 mg, $1.2 \times 10^{-3}$ moles) were added and dissolved at room temperature. The mixture was split into two equal parts and in the second part, the triethylphosphite efficiency amplifier (63 mg, $8 \times 10^{-4}$ moles) was added. The formulation was then coated onto a glass plate and exposed to 365 nm radiation in air. After irradiation, the sample was washed with acetone and the cure efficiency measured in terms of the amount of crosslinked polymer left. The results are summarized below in TABLE VIII.

TABLE VIII

Effect of Efficiency Amplifier Phosphite on Photocuring in Air

| | Degree of Curing | Material left after Solvent Wash? |
|---|---|---|
| Comparative Example 5 OZ-1 + S-9 | No | No |
| Invention Example 6 OZ-1 + S-9 + Triethylphosphite | Extensive curing | Yes |

These results clearly show that in the presence of the efficiency amplifier improves photocuring of the polymerizable composition quite extensively relative to the composition used in Comparative Example 5.

The invention has been described in detail with particular reference to certain preferred embodiments thereof, but it will be understood that variations and modifications can be effected within the spirit and scope of the invention.

The invention claimed is:

1. A photocurable composition comprising:
   at least one N-oxyazinium salt photoinitiator,
   a photosensitizer for the N-oxyazinium salt photoinitiator,
   an N-oxyazinium salt efficiency amplifier, and
   one or more photocurable acrylates, wherein the N-oxyazinium salt efficiency amplifier is an organic phosphite having the formula:

(R'O)$_3$P wherein the multiple R' groups are the same or different alkyl groups or HO[{CH(R)}$_x$O]$_y$ groups wherein the multiple R groups are the same or different hydrogen atoms or alkyl groups, or two R' groups can form a cyclic aliphatic ring or fused ring system, x is a number at least 2 and up to and including 20, and y is at least 1 and up to and including 20.

2. The photocurable composition of claim 1 comprising one or more of trimethyl phosphite, triethyl phosphite, tripropyl phosphite, tributyl phosphite, triisobutyl phosphite, triamyl phosphite, trihexyl phosphite, trinonyl phosphite, tri-(ethylene glycol) phosphite, tri-(propylene glycol) phosphite, tri(isopropylene glycol) phosphite, tri-(butylene glycol) phosphite, tri-(isobutylene glycol) phosphite, tri-(pentylene glycol) phosphite, tri-(hexylene glycol) phosphite, tri-(nonylene glycol) phosphite, tri-(diethylene glycol) phosphite, tri-(triethylene glycol) phosphite, tri-(polyethylene glycol) phosphite, tri-(polypropylene glycol) phosphite, or tri-(polybutylene glycol) phosphite as N-oxyazinium salt efficiency amplifiers.

3. The photocurable composition of claim 1 wherein the N-oxyazinium salt efficiency amplifier is a phosphite that is present at a molar ratio to the N-oxyazinium salt photoinitiator is at least 0.001:1 and up to and including 10:1.

4. The photocurable composition of claim 1 wherein the at least one N-oxyazinium salt photoinitiator is represented by either of the following Structures (I) or (II):

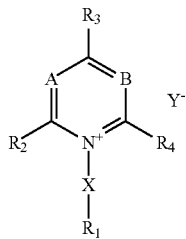

(I)

wherein A and B in Structure (I) independently represent a carbon, C—R$_5$, C—R$_6$ or nitrogen, X is O, R$_1$, R$_2$, R$_3$, R$_4$, R$_5$, and R$_6$ are independently hydrogen, or alkyl or aryl groups, any of the A, B, and R groups where chemically feasible can be joined to form a ring, and Y is a charge balancing anion that can be a separate moiety or part of an A, B, or R,

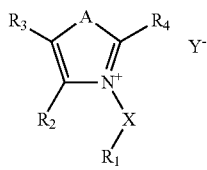

(II)

wherein A in Structure (II) represents a carbon, C—R$_5$, nitrogen, sulfur or oxygen atom with sufficient bonds and substituents to form a heteroaromatic ring, X is O, R$_1$, R$_2$, R$_3$, R$_4$, and R$_5$ are independently hydrogen, or alkyl or aryl groups, or any two R groups may form a ring, and Y is a charge balancing anion that can be a separate moiety or part of an R group.

5. The photocurable composition of claim 4 wherein R$_1$ is an alkyl group having 1 to 18 carbon atoms or an aryl group having 6 or 10 carbon atoms in the aromatic ring.

6. The photocurable composition of claim 1 wherein the at least one N-oxyazinium salt photoinitiator has a cation represented by one of the following formulae:

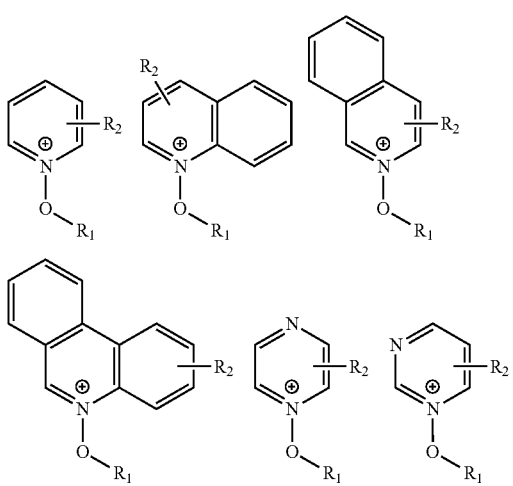

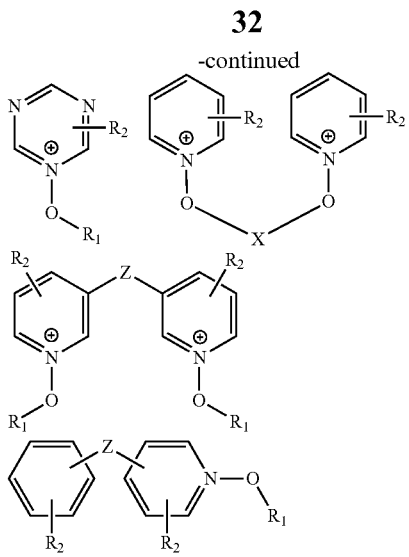

wherein R$_1$ represents a substituted or unsubstituted alkyl group, substituted or unsubstituted aryl group, or an acyl group, wherein R$_1$ can also include a charge balancing anion, the R$_2$ groups independently represent hydrogen, or a substituted or unsubstituted alkyl, aryl, or heteroaryl group, X is a divalent linking group, and Z is an alkylidene group.

7. The photocurable composition of claim 1 wherein the at least one N-oxyazinium salt photoinitiator has a reduction potential less negative than −1.4 V and comprises an N-oxy group that is capable of releasing an oxy radical during irradiation of the photocurable composition.

8. The photocurable composition of claim 1 comprising one or more of the compounds OZ-1 to OZ-16 identified below:

OZ-1

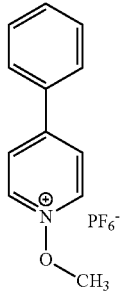

OZ-2

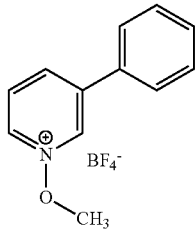

OZ-3

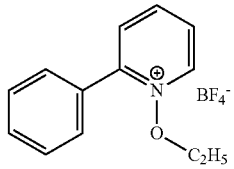

-continued
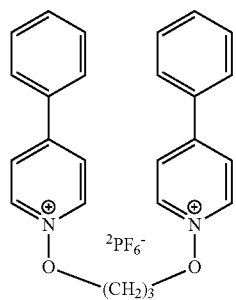
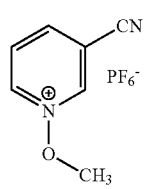
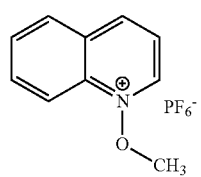
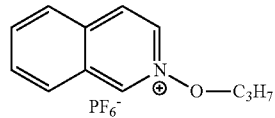
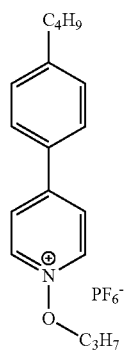
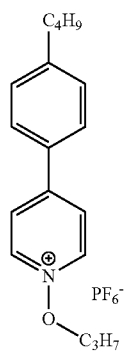
-continued
OZ-4
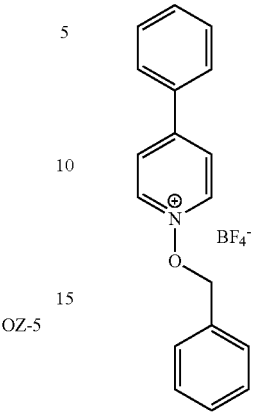
OZ-5
OZ-6
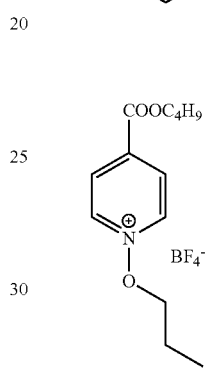
OZ-7
OZ-8
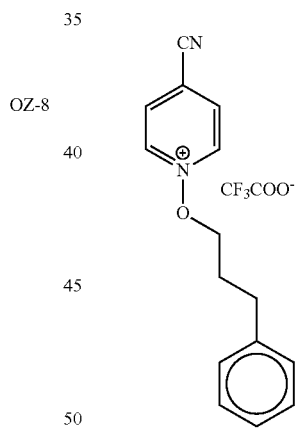
OZ-9
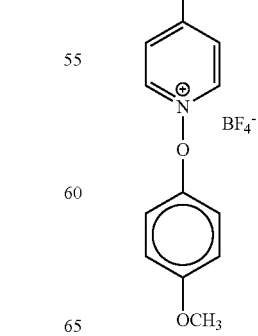
OZ-10
OZ-11
OZ-12
OZ-13

-continued

OZ-14
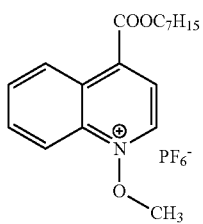

OZ-15
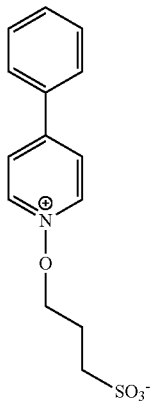

OZ-16
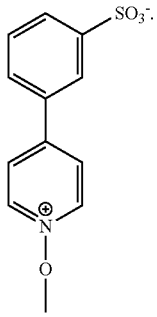

9. The photocurable composition of claim 1 comprising the at least one N-oxyazinium salt photoinitiator in an amount of at least $6 \times 10^{-7}$ and up to and including $6 \times 10^{-2}$ moles per gram of photocurable acrylate.

10. The photocurable composition of claim 1 wherein the photosensitizer is present in an amount of at least $5 \times 10^{-7}$ and up to and including $1 \times 10^{-4}$ moles per gram of photocurable acrylate.

11. The photocurable composition of claim 1 wherein the photosensitizer for the N-oxyazinium salt photoinitiator has a triplet energy of at least 20 kcal/mole of N-oxyazinium salt photoinitiator.

12. The photocurable composition of claim 1 wherein the photosensitizer for the N-oxyazinium salt photoinitiator absorbs radiation having a $\lambda_{max}$ of at least 150 nm and up to and including 1250 nm.

13. The photocurable composition of claim 1 wherein the photosensitizer for the N-oxyazinium salt photoinitiator is a ketocoumarin, xanthone, thioxanthone, arylketone, or polycyclic aromatic hydrocarbons.

14. The photocurable composition of claim 1 wherein the photosensitizer for the N-oxyazinium salt photoinitiator is a cyanine or merocyanine dye.

15. The photocurable composition of claim 1 wherein the photocurable acrylate is a monomeric material.

16. The photocurable composition of claim 1 wherein the photosensitizer for the N-oxyazinium salt photoinitiator is covalently bound as part of the photocurable acrylate.

17. The photocurable composition of claim 1 wherein the photocurable acrylate is a photocurable resin having a weight average molecular weight of at least 100,000.

18. A kit comprising, separately packaged:
  a) a precursor composition comprising one or more photocurable acrylates, and
  b) a photoinitiator composition comprising at least one N-oxyazinium salt photoinitiator, a photosensitizer for the N-oxyazinium salt photoinitiator, and an N-oxyazinium salt efficiency amplifier that is an organic phosphite having the formula:

$$(R'O)_3P$$

wherein the multiple R' groups are the same or different alkyl groups or $HO[\{CH(R)\}_xO]_y$ groups wherein the multiple R groups are the same or different hydrogen atoms or alkyl groups, or two R' groups can form a cyclic aliphatic ring or fused ring system, x is a number at least 2 and up to and including 20, and y is at least 1 and up to and including 20.

19. The kit of claim 18 wherein the N-oxyazinium salt efficiency amplifier is present in the photoinitiator composition at a molar ratio to the N-oxyazinium salt photoinitiator is at least 0.001:1 and up to and including 10:1.

20. The kit of claim 18 wherein the precursor composition is in liquid form and the photoinitiator composition is in solid form.

21. The kit of claim 18 wherein both precursor composition and photoinitiator composition are in solid form.

* * * * *